United States Patent [19]

Strasser et al.

[11] Patent Number: 5,775,068

[45] Date of Patent: Jul. 7, 1998

[54] BAG FORMING, FILLING AND SEALING MACHINE WITH ENDLESS SUPPORTING BELTS

[75] Inventors: Thomas Strasser, Benken; Theo Walz, Neunkirch; Werner Kern, Schaffhausen, all of Switzerland

[73] Assignee: SIG Schweizerische Industrie-Gesellschaft, Neuhausen am Rheinfall, Switzerland

[21] Appl. No.: 809,969

[22] PCT Filed: Sep. 22, 1995

[86] PCT No.: PCT/CH95/00214

§ 371 Date: Mar. 31, 1997

§ 102(e) Date: Mar. 31, 1997

[87] PCT Pub. No.: WO96/10516

PCT Pub. Date: Apr. 11, 1996

[30] Foreign Application Priority Data

Oct. 3, 1994 [CH] Switzerland .................. 02980/94

[51] Int. Cl.⁶ .................. B65B 9/06; B65G 15/14; B65G 15/44
[52] U.S. Cl. .................. 53/550; 198/626.1; 198/626.6
[58] Field of Search .................. 198/626.6, 626.5, 198/626.1, 803.8; 53/450, 550

[56] References Cited

U.S. PATENT DOCUMENTS

| | | | |
|---|---|---|---|
| 3,179,237 | 4/1965 | Ninneman | 198/626.6 X |
| 4,064,987 | 12/1977 | Rowan | 198/626.6 X |
| 4,798,281 | 1/1989 | Egger | 198/626.5 |
| 4,905,349 | 3/1990 | Townsend | 53/550 X |
| 5,052,166 | 10/1991 | Ziegler et al. | 53/550 X |
| 5,090,557 | 2/1992 | Carmen | 198/626.6 X |
| 5,109,654 | 5/1992 | Suga | 53/550 X |
| 5,154,281 | 10/1992 | Garner | |
| 5,177,935 | 1/1993 | Jones et al. | 53/550 X |
| 5,255,495 | 10/1993 | Kovacs | 53/550 X |
| 5,269,119 | 12/1993 | Tolson | 198/626.5 |

FOREIGN PATENT DOCUMENTS

| | | |
|---|---|---|
| 0227599 | 7/1987 | European Pat. Off. . |
| 376047 | 4/1964 | Switzerland . |
| 581047 | 10/1976 | Switzerland . |
| 1274832 | 5/1972 | United Kingdom . |
| 1444277 | 7/1976 | United Kingdom . |
| 2224991 | 5/1990 | United Kingdom . |

*Primary Examiner*—Horace M. Culver
*Attorney, Agent, or Firm*—Spencer & Frank

[57] ABSTRACT

An arrangement for an endless belt includes an endless belt having an inside adapted to be driven by a transport wheel and an outside. Elastic fingers are attached to the outside of the endless belt. The elastic fingers are substantially evenly spaced from one another. Each elastic finger has a free end and another end that constitutes a fastening point to the endless belt. Each elastic finger has a curved shape between the free end and the fastening point and presents a clamping region between the free end and the fastening point.

16 Claims, 4 Drawing Sheets

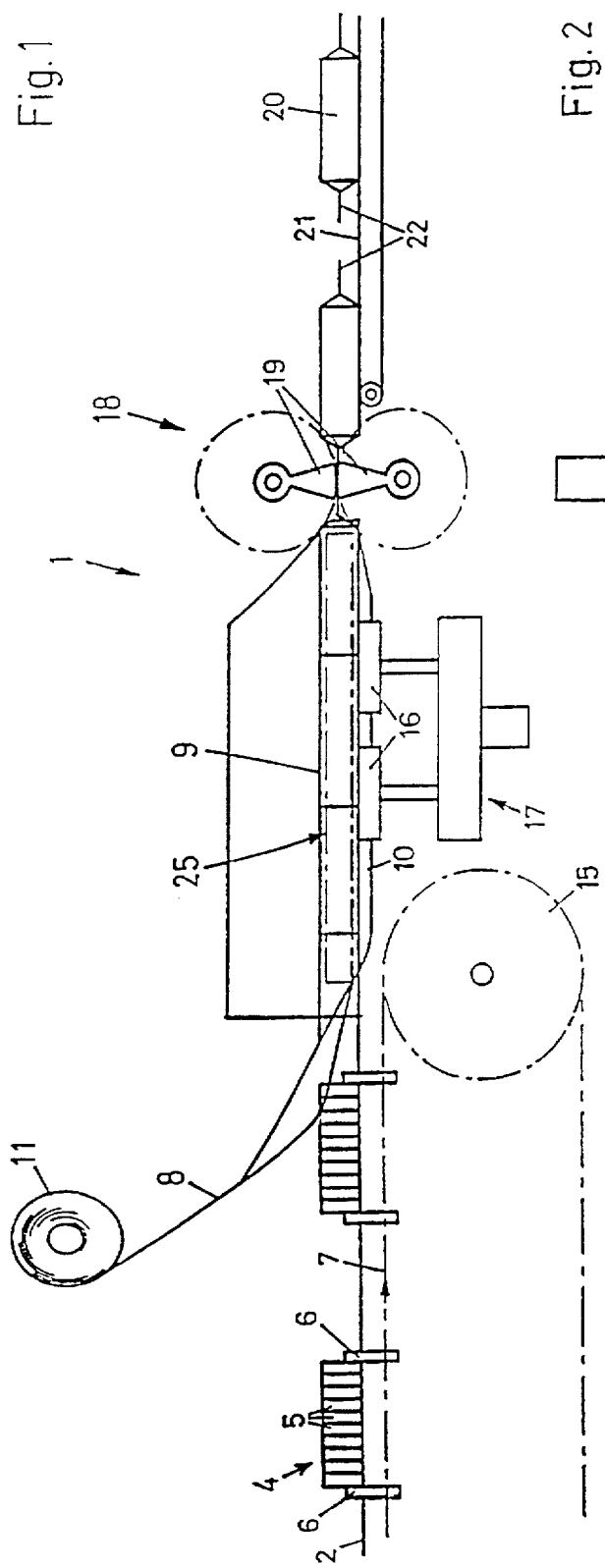
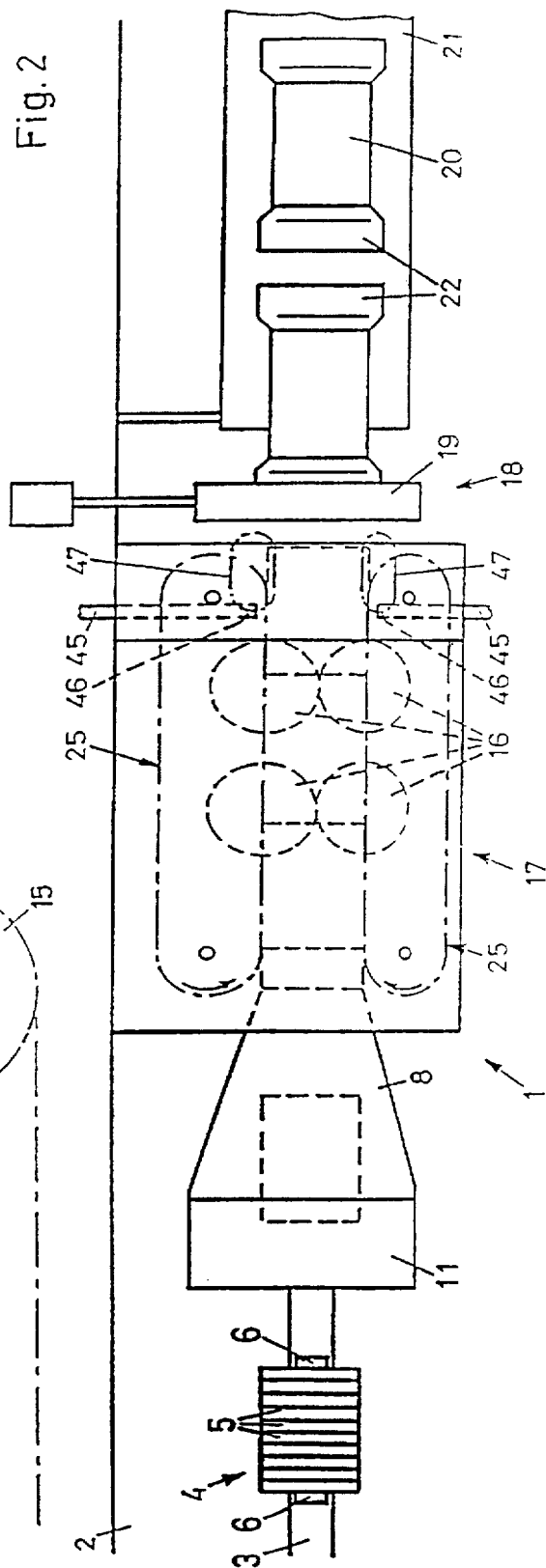

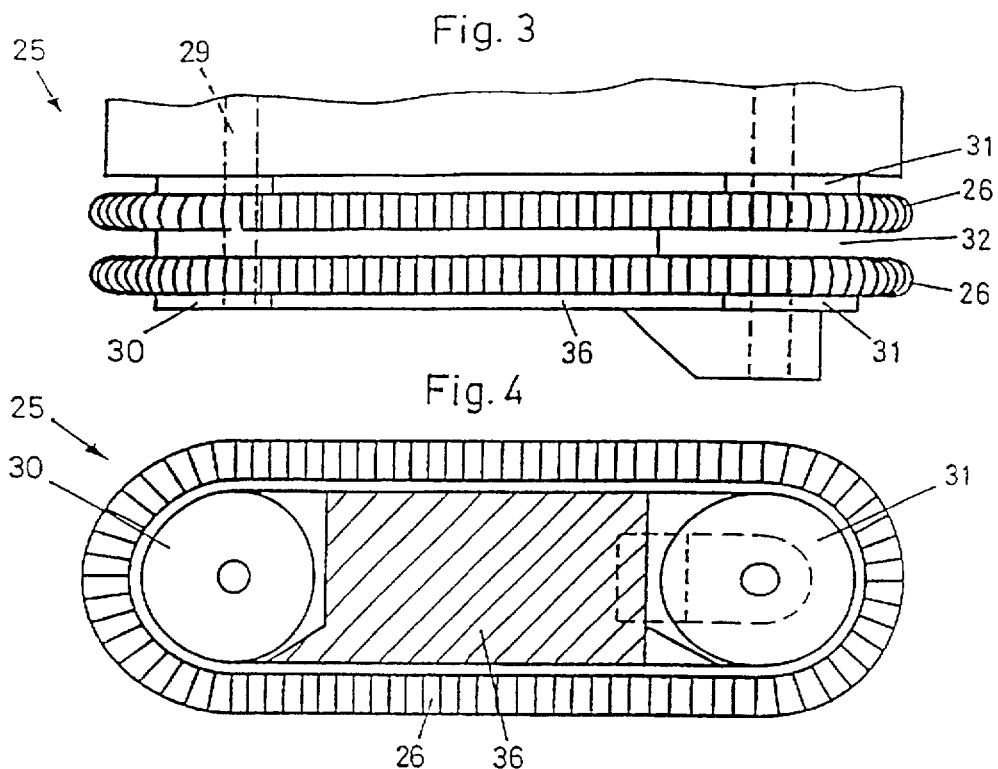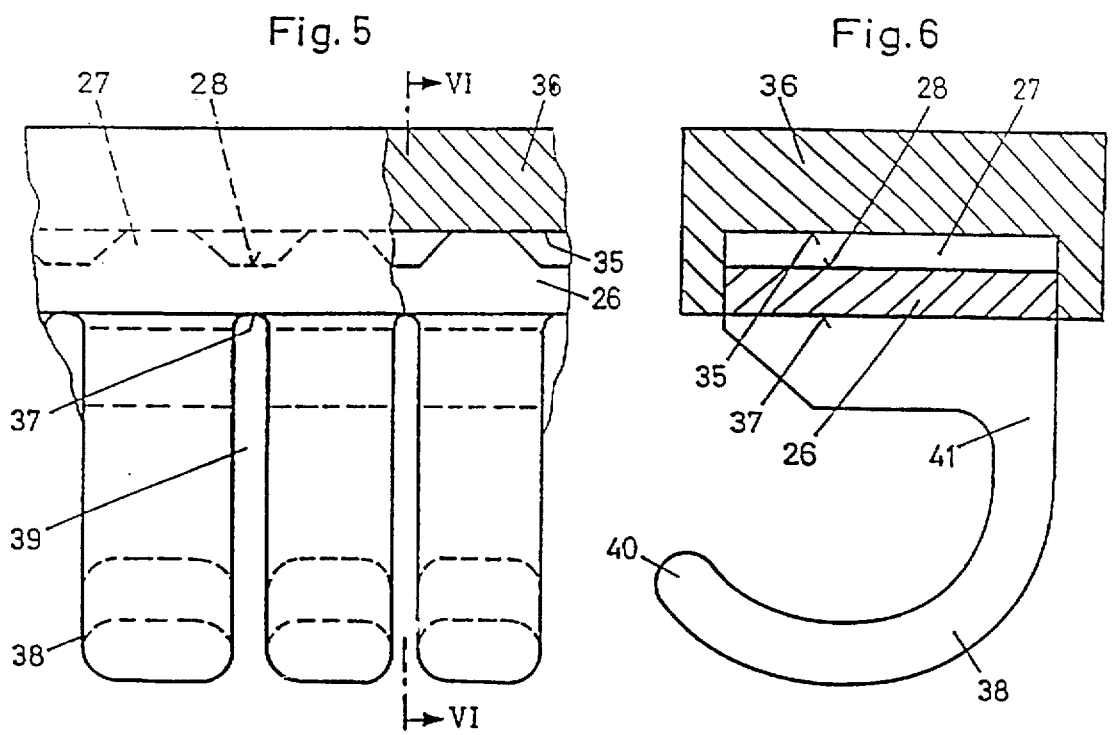

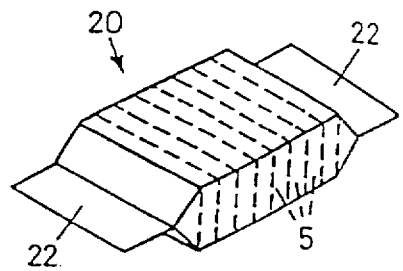
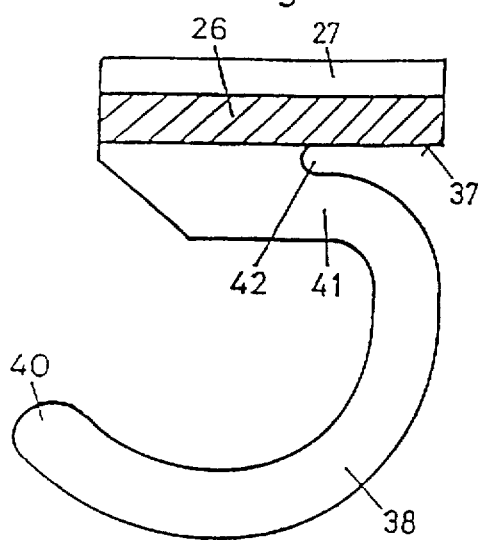
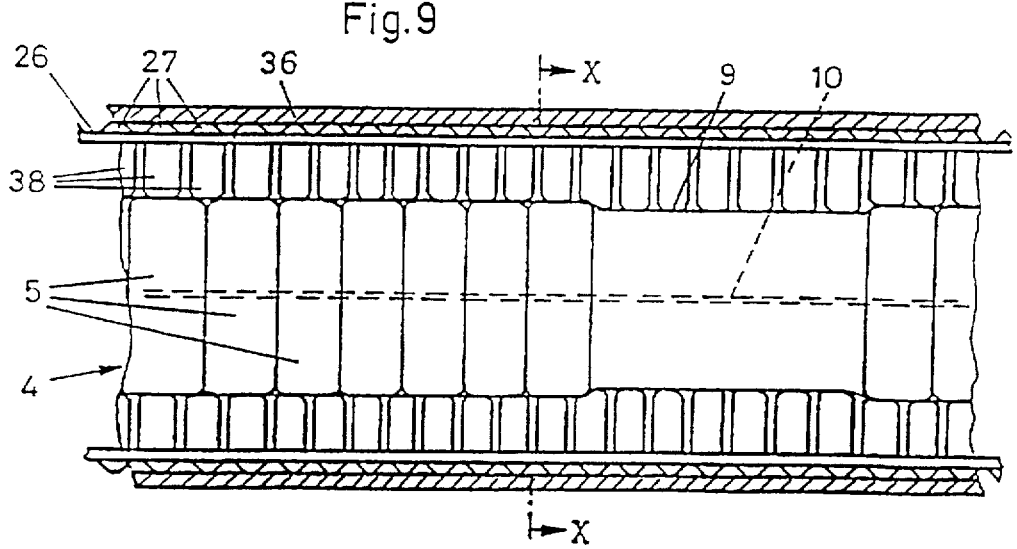
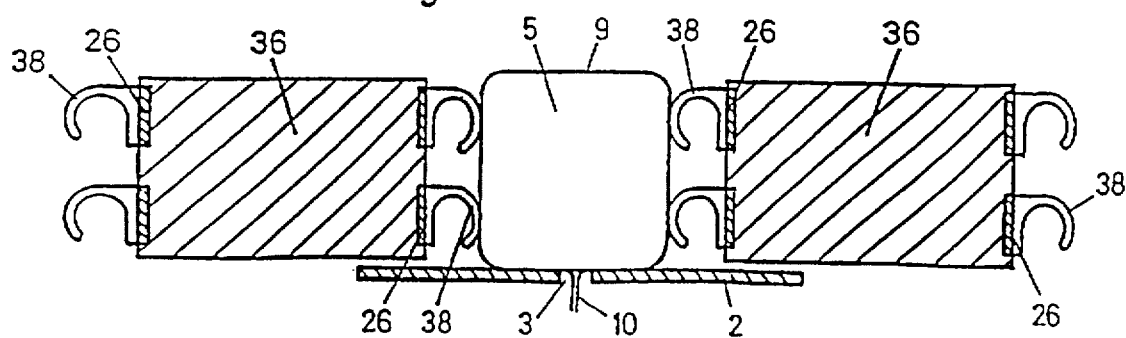

BAG FORMING, FILLING AND SEALING MACHINE WITH ENDLESS SUPPORTING BELTS

BACKGROUND OF THE INVENTION

Packaging machines for groups of vertically standing discs, e.g. biscuits, are known, for example, from the Swiss Patent Nos. 376 047 and 581 047. The spaced-apart groups are advanced by driving plates on a table. A packaging material band is used to form a tube around the groups and is sealed with a longitudinal sealing seam. Transverse sealing seams are formed downstream between the groups, and the individual packages are separated. In order to prevent individual discs in the group from being displaced or tilted inside the tube, metal holders are inserted into the spaces between the groups by means of chains circulating along the side, which holders are pulled out just prior to the transverse sealing station. These devices are not very flexible, since a change in format for the biscuits and the group lengths requires that the chains be replaced each time by other chains with matching form and spacing for the holders.

SUMMARY OF THE INVENTION

It is the object of the invention at hand to avoid the above disadvantage. The above and other objects are accomplished according to the invention by the provision of an arrangement for an endless belt, comprising: an endless belt having an inside adapted to be driven by a transport wheel and an outside; and elastic fingers attached to the outside of the endless belt, the elastic fingers being substantially evenly spaced from one another, each elastic finger having a free end and another end that constitutes a fastening point to the endless belt, and each elastic finger having a curved shape between the free end and the fastening point and presenting a clamping region between the free end and the fastening point.

According to a further aspect of the invention there is additionally provided a packaging machine including at least two belts as defined above, the packaging machine further comprising: feed means for continuously feeding groups of vertically standing discs at regular intervals; a device for forming a tube from packaging material around the continuously fed groups, with the two belts being arranged on opposite sides of the tube; a longitudinal sealing device for forming a longitudinal sealing seam on the tube; a transverse sealing device downstream of the longitudinal sealing device for forming a transverse sealing seam on the tube of packaging material between adjacent ones of the groups of vertically standing discs; and a transport wheel assigned to each belt for synchronously driving the belts with a forward feed for the packaging tube, wherein a number of the elastic fingers of each belt press the packaging tube into gaps between the groups of vertically standing discs and an additional number of elastic fingers push the packaging tube against the vertically standing discs of the respective groups.

BRIEF DESCRIPTION OF THE DRAWINGS

An embodiment of the invention is explained in the following with the aid of the drawings. Shown are in:

FIG. 1 A diagrammatic view from the side of a packaging machine;

FIG. 2 A view from above of the machine;

FIG. 3 A view from the side of a supporting device;

FIG. 4 A view from above of the supporting device;

FIG. 5 A longitudinal cut through a belt with guide;

FIGS. 6 and 7 Cuts along the line VI—VI in FIG. 5 for two variants of the belt;

FIG. 8 A perspective view of a package;

FIG. 9 A detail of the supporting device;

FIG. 10 A cut along the line X—X in FIG. 9 and

DETAILED DESCRIPTION OF THE INVENTION

Figure 11:
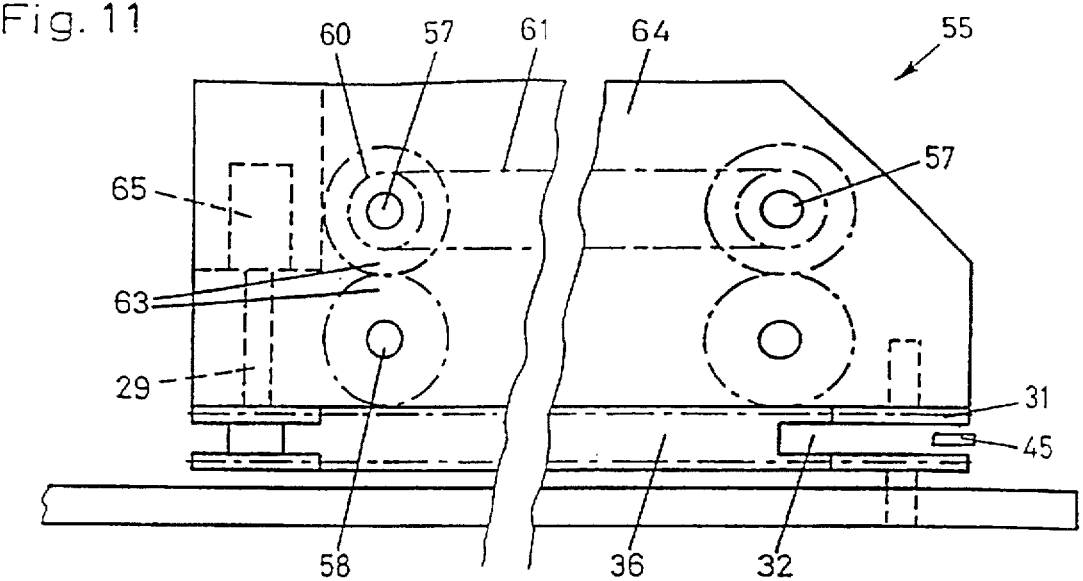
FIGS. 11/12 A diagrammatic representation of an adjustment device.

A horizontal bag forming, filling and sealing machine 1 is shown diagrammatically in FIGS. 1 and 2. On a horizontal table 2 with a longitudinal slot 3, groups 4 of adjoining, vertically standing discs, for example biscuits 5 are supplied. For that, regularly spaced pairs of drivers 6, which are attached to a circulating chain 7, extend through the slot 3. Next to the downstream end of the chain 7, a tube 9 is formed around the group 4 with a packaging material foil 8, which tube has a longitudinal fin-type seam 10 on the underside. The foil 8 is pulled off a supply roll 11.

Downstream from a downstream deflection wheel 15 for the chain 7, the seam 10 is sealed with two pairs of heated sealing rollers 16 of a longitudinal sealing station 17, which sealing rollers simultaneously function as drive for advancing the tube 9. The station 17 is followed by a transverse sealing station 18 with a pair of counterrotating, cylinder segment-shaped sealing jaws 19. One of the sealing jaws 19 comprises a knife, which is not shown and functions to sever the individual packages 20 from the tube 9 in the center of the formed transverse sealing seam 22. The packages 20 are removed by a conveyor belt 21 that operates at a higher circumferential speed than the jaws 19.

In order to prevent moving or tilting of that in particular the first and last biscuits 5 of a group 4 in the tube 9, one each supporting device 25, which is shown in more detail in FIGS. 3 to 12, is arranged on each side of tube 9 in the region of wheel 15 until just before the transverse sealing station 18. The supporting device 25 comprises, on both sides, two belts 26 with teeth 27 on the inside 28, which are arranged one above the other. At the upstream end, the belts 26 are guided over two gearwheels 30 that are fitted on the same drive shaft 29 and are arranged one above the other. At the downstream end, the belts 26 are guided over two coaxial, spaced-apart, individually positioned deflection rollers 31. A gap 32 is left between the rollers 31 so that a supporting and folding element can engage, which is explained later on.

The runs of belts 26 that face each other, are guided in an upward and in transverse direction inside a rectangular groove 35 of a rail 36. The rail 36 extends between the wheels 30 and the rollers 31. Curved elastic fingers 38 are fastened to the outside 37 of belts 26 with the same spacing as the teeth 27 and opposite a respective one of the teeth. The fingers 38 are preferably welded to the belt 26 or are injection molded as one piece with the belt. That is why the fingers 38 preferably are composed of the same material as the outside 37 of belt 26, preferably of plastic, e.g. an elastomer, in particular of polyurethane. Owing to the fact that the fingers 38 are located opposite the teeth 27, considerably smaller deflection radii can be realized, which is important especially with the downstream deflection roller 31. In straight belt segments, the fingers 38 are wider than the intermediate spaces 39 between the fingers 38. The free end 40 of the fingers 38 is closer to the belt 26 than the center portion of the curved segment of the finger that forms the clamping range. The edges of fingers 38 are rounded. In longitudinal direction of the belt, the fingers 38 are less elastic than transverse to belt 26.

FIG. 7 shows a variant of the belt 26 according to FIG. 6, in which the fastening point 41 for fingers 38 is moved closer to the belt center with the aid of a recess 42. The fingers 38 are even more elastic with this variant.

FIG. 9 shows a horizontal cross section of a portion of the transport path between the wheels 30 and the rollers 31. As can be seen, the width of fingers 38 is not adjusted to the width of biscuits 5. That is why the same belts 26 can be used for varied thicknesses and formats of the biscuits 5. In the intermediate spaces between the groups 4 of biscuits 5, the spring force of the fingers 38 compresses the tube 9 somewhat so that the outermost biscuits 5 of a group 4 are held securely. They cannot tilt over or move. The remaining fingers 38 push the tube 9 against the biscuits 5, so that the group 4 inside tube 9 is transported as a compact unit. In this case, the rotational speed for the belts 26 is the same as the circumferential speed of the sealing rollers 16.

Two rod-shaped folding and supporting elements 45 that face each other are indicated in FIG. 2, the front ends 46 of which circulate along an 0-shaped path 47. The circumferential speed for the ends 46 in the entered region corresponds to that of the sealing rollers 16. The supporting elements 45 extend through the slots 32 between belts 26 spaced one above the other on each side of the tube 9 (FIG. 3). The ends 46 of the supporting elements 45 thus support the front biscuits 5 of a group 4, before their support through fingers 38 of the belts 26 stops. As a result of this, the groups 4 of biscuits 5 are guided reliably, in a compact form, within the tube 9 toward the transverse sealing station 18. There, the supporting elements 45 are pulled out only after the sealing jaws 19 have already dipped into the intermediate space between the groups 4. As a result of this, a continuous support of the outer biscuits 5 of the groups 4 up to the transverse sealing station 18 and simultaneously the formation of a wedge-type transverse fold is made possible, which results in an attractive package 20 (FIG. 8).

Figure 12:
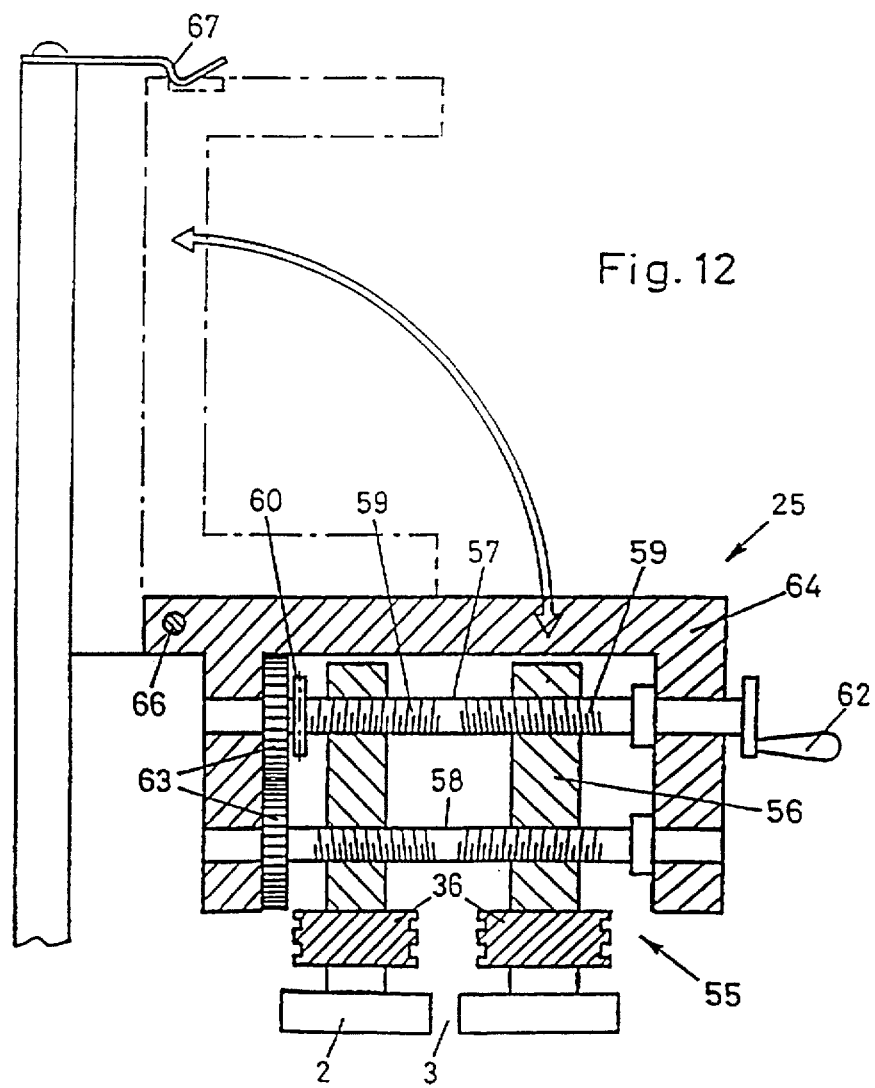

An adjustment device 55 for adjusting the mutual distances between the belt pairs located opposite each other is shown diagrammatically in the FIGS. 11 and 12. Two each vertical pedestals 56 (FIG. 12) are fastened to the rails 36, into which two threaded spindles 57, 58 are screwed. The spindles 57, 58 have two each counter-running threads 59. The two upper spindles 57 are connected through chain wheels 60 and a chain 61. One of these has a crank 62. The two spindles 57, 58 of each pedestal 56, which are disposed one above the other, are also connected to each other via toothed wheels 63. The spindles 57, 58 are positioned rotatably inside a holder 64. When crank 62 is turned, all four spindles 57, 58 rotate synchronously, so that the rails 36 are displaced parallel either away from each other or toward each other. A motor 65 for driving the shafts 29 is also indicated in FIG. 11. The holder 64 can swing up around a horizontal axis 66 by 90° to facilitate the maintenance. It is held in the up position by a catch 67. The holder 64 can also be designed such that the height can be adjusted.

A high operating safety is achieved with the device described herein, even for high product tolerances. The changeover to other formats for the biscuits 5 or other lengths for the groups 4 is possible without problem, without having to replace the belts 26. The tube 9 is pushed gently against the products. There is no danger of perforation. The belts 26 are easy to clean and hygienically perfect. Owing to the fact that the fingers 38 do not rest against the tube 9 with their ends 40, but with a curved section, a certain rolling-off movement in the finger plane results during the resilient yielding, meaning transverse to the longitudinal direction of the belt, so that the resulting force has hardly any components in longitudinal direction of the tube and in height direction. With this, a high output and high position stability for the products is achieved, even with the discontinuous operation, so that any waste is for the most part avoided.

We claim:
1. An arrangement for an endless belt, comprising:
    an endless belt having an inside adapted to be driven by a transport wheel and an outside; and
    elastic fingers attached to the outside of the endless belt, the elastic fingers being substantially evenly spaced from one another, each elastic finger having a free end and another end that constitutes a fastening point to the endless belt, and each elastic finger having a curved shape between the free end and the fastening point and presenting a clamping region between the free end and the fastening point.
2. The arrangement according to claim 1, wherein the endless belt defines a plane and each finger defines a plane that extends transverse to the endless belt plane.
3. The arrangement according to claim 1, wherein, on a straight line segment of the endless belt, an intermediate space between respectively adjacent fingers is smaller than a width of a finger.
4. The arrangement according to claim 1, wherein the inside of the belt has regularly spaced teeth.
5. The arrangement according to claim 4, wherein each finger is located opposite a respective one of the teeth.
6. The arrangement according to claim 1, wherein the free end of each finger is located closer to the belt than an outer portion of the curved shape of the finger.
7. The arrangement according to claim 1, wherein the fingers and at least the outside of the belt are comprised of the same material.
8. The arrangement according to claim 1, wherein the fingers are composed of synthetic material.
9. The arrangement according to claim 8, wherein the synthetic material comprises an elastomer.
10. The arrangement according to claim 9, wherein the elastomer comprises polyurethane.
11. A packaging machine including at least two belts as defined in claim 1, and further comprising:
    feed means for continuously feeding groups of vertically standing discs at regular intervals;
    a device for forming a tube from packaging material around the continuously fed groups, with the two belts being arranged on opposite sides of the tube;
    a longitudinal sealing device for forming a longitudinal sealing seam on the tube;
    a transverse sealing device downstream of the longitudinal sealing device for forming a transverse sealing seam on the tube of packaging material between adjacent ones of the groups of vertically standing discs; and
    a transport wheel assigned to each belt for synchronously driving the belts with a forward feed for the packaging tube, wherein a number of the elastic fingers of each belt press the packaging tube into gaps between the groups of vertically standing discs and an additional number of elastic fingers push the packaging tube against the vertically standing discs of the respective groups.
12. The machine according to claim 11, wherein the transport wheel of each belt is located at an upstream end of the belt relative to the tube being formed around the groups and a deflection element is located downstream next to the transverse sealing device.
13. The machine according to claim 12, wherein each belt is guided between the transport wheel and the deflection element on the inside of the belt in an upward direction by a rail extending in a transverse direction relative to a plane defined by the belt.

14. The machine according to claim 12, wherein the belt on each side of the tube comprises two belts spaced at a distance one above the other.

15. The machine according to claim 14, wherein the deflection elements each have an interruption corresponding to the space between the two belts space above one another on each side of the tube, and further including supporting and folding elements disposed, respectively, for horizontal movement in the interruptions.

16. The machine according claim 11, wherein the two belts disposed on opposite sides of the tube are separated by a distance and further including means for adjusting the distance between the two belts.

* * * * *